(12) United States Patent
Hammer

(10) Patent No.: US 12,320,232 B2
(45) Date of Patent: Jun. 3, 2025

(54) CONTROLLED DEPLOYMENT OF SHAPE-MEMORY ARTICLES USING EMULSIFIED FLUIDS

(71) Applicant: Baker Hughes Oilfield Operations LLC, Houston, TX (US)

(72) Inventor: Aaron C. Hammer, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 45 days.

(21) Appl. No.: 18/335,479

(22) Filed: Jun. 15, 2023

(65) Prior Publication Data
US 2024/0418053 A1    Dec. 19, 2024

(51) Int. Cl.
*E21B 33/16* (2006.01)
*C09K 8/50* (2006.01)
*E21B 43/34* (2006.01)

(52) U.S. Cl.
CPC .............. *E21B 33/165* (2020.05); *C09K 8/50* (2013.01)

(58) Field of Classification Search
CPC .......... E21B 33/165; E21B 43/34; C09K 8/50
USPC ......................................................... 166/300
See application file for complete search history.

(56) References Cited

U.S. PATENT DOCUMENTS

| | | | |
|---|---|---|---|
| 7,318,481 B2 | 1/2008 | Richard | |
| 7,638,921 B2* | 12/2009 | Browne | B29C 61/00 |
| | | | 310/307 |
| 7,743,825 B2 | 6/2010 | O'Malley et al. | |
| 7,926,565 B2 | 4/2011 | Duan et al. | |
| 8,042,618 B2 | 10/2011 | Weaver et al. | |
| 8,048,348 B2 | 11/2011 | Duan et al. | |
| 8,100,190 B2 | 1/2012 | Weaver et al. | |
| 8,240,392 B2 | 8/2012 | Barnard et al. | |
| 8,353,346 B2 | 1/2013 | Johnson et al. | |
| 8,739,408 B2 | 6/2014 | Duan et al. | |
| 8,739,876 B2 | 6/2014 | Saini et al. | |
| 8,960,314 B2 | 2/2015 | Ramon et al. | |
| 9,051,805 B2* | 6/2015 | Johnson | B29C 61/00 |
| 9,068,437 B2* | 6/2015 | Carrejo | B29C 61/0608 |
| 9,120,898 B2 | 9/2015 | Ren et al. | |
| 9,260,951 B2* | 2/2016 | Dagenais | E21B 43/08 |
| 9,878,486 B2 | 1/2018 | Liu et al. | |
| 11,525,341 B2 | 12/2022 | Kovalchuk et al. | |
| 2013/0160126 A1 | 6/2013 | Kapoor et al. | |
| 2014/0332220 A1 | 11/2014 | Garza et al. | |
| 2016/0160617 A1 | 6/2016 | Garza et al. | |
| 2017/0362405 A1 | 12/2017 | Murugesan et al. | |
| 2022/0003081 A1 | 1/2022 | Kovalchuk | |

(Continued)

*Primary Examiner* — William D Hutton, Jr.
*Assistant Examiner* — Ashish K Varma
(74) *Attorney, Agent, or Firm* — Baker Hughes Patent Organization

(57) ABSTRACT

A method of installing a downhole device includes introducing a downhole device into a wellbore, the downhole device having a shape-memory article, the shape-memory article including a shape-memory polymer, wherein the downhole device is disposed when the shape-memory article is in a compacted shape; exposing the shape-memory article to a deployment emulsion containing an activation fluid emulsified in a non-reactive fluid; breaking the deployment emulsion to release the activation fluid; and contacting the shape-memory article in the compacted shape with the released activation fluid to deploy the shape-memory article.

18 Claims, 1 Drawing Sheet

(56) References Cited

U.S. PATENT DOCUMENTS

2022/0003083 A1 1/2022 Sadana et al.
2022/0010659 A1 1/2022 Sadana et al.

* cited by examiner

CONTROLLED DEPLOYMENT OF SHAPE-MEMORY ARTICLES USING EMULSIFIED FLUIDS

BACKGROUND

Shape-memory polymers (SMPs) are polymers that regain their original shape when heated above their glass transition temperature (Tg). Articles are formed from shape-memory polymers by first heating above the glass transition temperature and shaping the polymer, then subsequently fixing the shape by cooling to below the glass transition temperature. During deployment, the shaped articles are heated above the glass transition temperature or slightly below the glass transition temperature to allow recovery of the first molded shape. In addition to temperature change, the shape-memory effect can also be triggered by an electric or magnetic field, light, contact with a particular fluid or a change in pH.

Shape-memory polymers are useful as materials of construction of elements for a variety of downhole applications, particularly those that require the sealing off of a portion of a borehole or constricting the spacing around an element, whether coaxial with the borehole or otherwise. Shape-memory polymers can also be used as porous filters in sand control applications.

One challenge of deploying shape-memory articles is the potential of premature expansion. If a shape-memory article begins expanding while being run down hole, the article can become too large before it gets to the bottom, thus increasing the risk that the equipment cannot reach the targeted depth. This can leave the toe of the well unable to produce, which in turn can decrease the value of the well by a very large amount. Another challenge is incomplete expansion, which can also impact production. Accordingly, alternative effective methods to deploy shape-memory articles are continuously sought.

SUMMARY

A method of installing a downhole device includes introducing a downhole device into a wellbore, the downhole device having a shape-memory article, the shape-memory article including a shape-memory polymer, wherein the downhole device is disposed when the shape-memory article is in a compacted shape; exposing the shape-memory article to a deployment emulsion containing an activation fluid emulsified in a non-reactive fluid; breaking the deployment emulsion to release the activation fluid; and contacting the shape-memory article in the compacted shape with the released activation fluid to deploy the shape-memory article.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
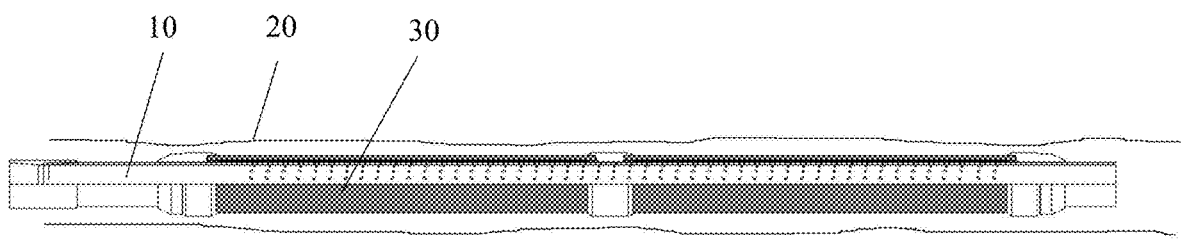
FIG. 1 illustrates a downhole device before deployment according to an embodiment of the disclosure.
Figure 2:
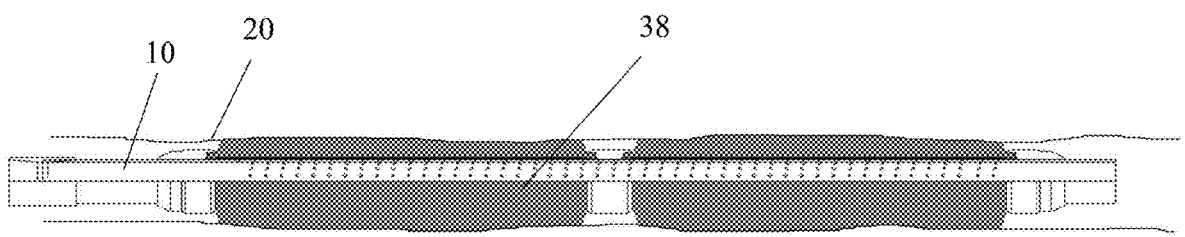
FIG. 2 illustrates the downhole device of FIG. 1 after deployment.

A detailed description of one or more embodiments of the disclosed apparatus and method are presented herein by way of exemplification and not limitation with reference to the Figures.

The inventor has found that by emulsifying an activation fluid in a non-reactive fluid, the expansion of shape-memory articles can be better controlled both against premature and incomplete expansion.

In addition, the emulsified fluid can be carried in with the shape-memory article and later activated, providing greater control. Further, less activation fluid is needed because the activation fluid does not have to be pumped or have to fill a large volume of the well. Since less fluid is used, other activation fluids that would otherwise be cost prohibitive can be considered.

An emulsified fluid is also referred to as a deployment emulsion. The deployment emulsion can comprise an activation fluid as a discontinuous internal phase and a non-reactive fluid as a continuous external phase. As used herein, the activation fluid refers to a fluid that is effective to reduce the glass transition temperature and/or rigidity of shape-memory polymers. On the other hand, the non-reactive fluid refers to a fluid that does not lower the glass transition temperature or change the rigidity of shape-memory polymers.

Depending on the specific shape-memory polymer used, the activation fluid may be a polar fluid, such as water or brine based fluid, or an oil based fluid comprising an oil and/or a non-polar solvent.

In an aspect, the non-reactive fluid is a non-polar fluid comprising at least an oil or a non-polar solvent, and the reactive fluid is a polar fluid comprising water, a brine, and/or an activator other than water/brine. In this instance, the emulsion can comprise the non-polar fluid as a continuous external phase, and the polar fluid as an internal discontinuous phase. Such an emulsion can also be referred to as an inverse emulsion.

In another aspect, the non-reactive fluid is an aqueous based fluid, and the reactive fluid is a non-polar fluid comprising at least an oil or a non-polar solvent. In this instance, the emulsion can comprise the aqueous based fluid as an external continuous phase, and the non-polar fluid as a discontinuous internal phase.

The deployment emulsion can also be a complex emulsion comprising a first non-reactive fluid as an external continuous phase, a second non-reactive fluid as a discontinuous internal phase, and an activation fluid disposed in the second non-reactive fluid. For example, the emulsion can comprise small droplets of activation fluid suspended in large droplets of second non-reactive fluid, which in turn is dispersed in a continuous first non-reactive fluid.

A complex emulsion can also comprise a first non-reactive fluid as an external continuous phase, an activation fluid as a discontinuous internal phase, and a second non-reactive fluid disposed in the activation fluid. For example, the emulsion can comprise small droplets of a second non-reactive fluid suspended in large droplets of an activation fluid, which in turn is dispersed in a continuous first non-reactive fluid.

The deployment emulsion can include more than one emulsions, for example, two, three, or four emulsions, each independently having an activation fluid as an internal phase and a non-reactive fluid as an external phase.

The oil or non-polar solvent in the deployment emulsion is not particularly limited, and may include a diesel oil, a paraffin oil, a vegetable oil, a soybean oil, a mineral oil, a crude oil, a gas oil, kerosene, an aliphatic solvent, an aromatic solvent, a synthetic oil, or a combination comprising at least one of the foregoing.

The activation fluid can contain an activator, which can include water, brine, dimethyl sulfoxide, ketones, alcohols, phenols, ethers, esters, or acids. More than one activator can be used. As used herein, an alcohol refers to an organic compound having one or more hydroxyl groups attached to a saturated carbon atom. Examples of the alcohols include methanol, ethanol, isopropyl alcohol, n-butanol, 2-butanol, isobutanol, tert-butanol, n-pentanol, isopentanol, 2-pentanol, hexanol, octanol, isooctanol, cyclohexanol, 2-methyl-1-butanol, 2-methyl-1-pentanol, 3-methyl-2-butanol, 2-ethylhexanol, or glycols. The alcohol can be substituted and include ethoxylated alcohols, propoxylated alcohols, ethoxylated and propoxylated alcohols, or 2-butoxyethanol. The ethoxylated and/or propoxylated alcohols can have a structure represented by the Formula R—$(OCH_2CH_2)_m$ $(OCH_2CH_2CH_2)_n$—OH, wherein R is a $C_{1-7}$ alkyl, $C_{1-5}$ alkyl, $C_{1-3}$ alkyl, or ethyl, m is 0 to 8, and n is 0 to 8, provided that the sum of m and is at least 1.

Examples of glycols include ethylene glycol, propylene glycol, 1,3-propanediol, 1,4-butanediol, 1,2,4-butanetriol, glycerin, erythritol, ethoxylated glycols, propoxylated glycols, ethoxylated and propoxylated glycols, diethylene glycol, and butoxy tri-glycol. Phenols can be substituted and include ethoxylated phenols, propoxylated phenols, or ethoxylated and propoxylated phenols.

Examples of esters include n-butyl acetate, n-butyl propionate, n-propyl propionate, n-pentyl propionate, or ethylene glycol monoethyl ether acetate. Exemplary ethers include ethylene glycol monobutyl ether (EGMBE). Specific ketones include acetone and acetylacetone. Examples of acids include adipate or maleate.

In an aspect, the activation fluid includes water or a brine. The water or brine may be present in the activation fluid in an amount of about 20 wt % to about 99 wt %, from about 30 wt % to about 90 wt %, or from about 40 wt % to about 80 wt %, based on the weight of the activation fluid.

The brine can include unsaturated up to saturated Ca, Na, K, Cs, or Zn halides or formate brine. Examples of the salts suitable for use in creating the brine include, sodium chloride, potassium chloride, calcium chloride, sodium bromide, calcium bromide, zinc bromide, sodium formate, potassium formate, cesium formate, or a combination comprising two or more of the foregoing salts. The density of the brine may range from about 8.4 pounds/gallon (lb/gal or ppg) to about 17 lb/gal (about 1 to about 2 kg/liter), about 8.4 lb/gal to about 14 lb/gal, or about 8.4 lb/gal to about 12 lb/gal. Brines with other densities can also be used. Optionally, the activation fluid can further include one or more activators described herein that are not water or brine.

The deployment fluid can further include at least one of an emulsifier, a surfactant, or a viscosifier. Emulsifiers used can be the same ones typically used in water-in-oil or oil-in-water emulsions. These include various fatty acid and derivatives thereof, clay, polymers such as polyamides, or a combination comprising at least one of the foregoing. Exemplary fatty acid derivatives include fatty acid soaps, such as the calcium soaps, which can be prepared by reacting a fatty acid with lime.

The deployment emulsion can also include at least one surfactant such as a non-ionic surfactant, an anionic surfactants, a cationic surfactant, or an amphoteric surfactant.

The deployment emulsion can have a very high viscosity. In the event that a shape-memory article is saturated with a deployment fluid, the high viscosity can prevent the fluid from existing the shape-memory article when the shape-memory article is run down hole.

A viscosifier can be used to increase the viscosity of deployment fluid. Examples of viscosifiers include hydratable polysaccharides, xanthan gum (which may or may not be crosslinked), cellulose, cellulose derivatives such as hydroxyethylcellulose (HEC); carboxymethylcellulose (CMC); hydroxypropylcellulose (HPC); and carboxymethylhydroxyethylcellulose (CMHEC), viscoelastic surfactants, or synthetic polymers such as polyacrylamides, polyacrylates, or diallyldimethylammonium chloride. A combination of two or more viscosifiers can be used.

The deployment emulsion can have a high affinity with the shape-memory article. The high affinity can be achieved via a high wettability between the shape-memory polymer and the non-reactive fluid. In an aspect, a contact angle of the non-reactive fluid on the shape-memory polymer can be less than 90° C., less than 60° C., less than 30° C., or less than 10° C., indicating good wettability.

To increase the affinity or wettability, the non-reactive fluid and the shape-memory polymer can have the same polarity. For example, both the non-reactive fluid and the shape-memory polymer can be polar, or both the non-reactive fluid and the shape-memory polymer can be non-polar.

If needed, the wettability of the shape-memory polymer can be altered to make sure that the shape-memory polymer and the non-reactive fluid have the same or similar polarity. Surfactants, solvents, nanoparticles or other materials can be used to impart hydrophobicity and/or oleophobicity to the shape-memory polymer to alter its wettability.

Due to the high affinity or great wettability between the non-reactive fluid and the shape-memory polymer, the deployment emulsion may not have the tendency to be displaced when the shape-memory article carries the deployment emulsion to the desired downhole location. When the shape-memory polymer has high affinity with the deployment fluid, the deployment fluid can have a relatively low viscosity.

The concentration of the activation fluid in the deployment fluid can be high enough to cause activation if the non-reactive fluid were not in place, without introducing any additional activation fluid through pumping. The amount of the activation fluid can be adjusted based on the specific shape-memory materials used. In an aspect, the activation fluid is present in an amount of about 5 vol. % to about 90 vol. %, about 15 vol. % to about 80 vol. %, or about 30 vol. % to about 70 vol. %, based on the total volume of the deployment fluid.

The density of the deployment emulsion can be tailored to match the density of the fluids in the wellbore. This would prevent the deployment emulsion from "floating" or "sinking" which could leave a portion of the shape-memory unexpanded due to the lack of contact with the deployment emulsion. Tailoring the fluid density can also help with well control.

The density of the deployment emulsion can be controlled by adjusting the ratio of the activation fluid and the non-reactive fluid. The density of the deployment emulsion can also be controlled by selecting a brine having the desired density. Weighting agents can also be added to the deployment emulsion to adjust its density.

Known techniques of preparing an invert emulsion can be used to make the deployment emulsion. For example, an activation fluid and a non-reactive fluid can be separately made, then combined and mixed, preferably at a high speed using a homogenizer. An emulsifier can be included in the activation fluid, the non-reactive fluid, or both.

Shape-memory articles that can be deployed comprise shape-memory polymers such as polyurethanes, epoxies, acrylates, nylon, polypropylene, polyesters, polytetrafluoroethylene, polyether ether ketone (PEEK), polyamides, polyureas, polyvinyl alcohols, vinyl alcohol-vinyl ester copolymers, phenolic polymers, polybenzimidazoles, polystyrenes, a crosslinked polymer such as a crosslinked polytetrafluoroethylene, polyethylene oxide/acrylic acid/methacrylic acid copolymer crosslinked with N,N'-methylene-bis-acrylamide, polyethylene oxide/methacrylic acid/N-vinyl-2-pyrrolidone copolymer crosslinked with ethylene glycol dimethacrylate, polyethylene oxide/poly(methyl methacrylate)/N-vinyl-2-pyrrolidone copolymer crosslinked with ethylene glycol dimethacrylate, a cross-linked product of a polyphenylene sulfide and a polyphenylsulfone, a crosslinked polyphenylene sulfide, a crosslinked polyaryletherketone, a crosslinked polyetherether ketone, a crosslinked polyethersulfone (PESU), a crosslinked polyphenylenesulfone (PPSU), a crosslinked polyphenylenesulfone urea, or a combination comprising at least one of the foregoing polymers. Materials that may be selected are not limited to the aspects described herein, as other materials may be selected based on considerations such as downhole temperature, types of substances encountered downhole, and activation fluids, etc. The shape-memory articles can be a foam. For sand control applications, the shape-memory articles are open cell foams. Bulk shape-memory polymer can also be used.

In an aspect, the shape-memory article is a polyurethane foam. The polyurethane foam can be extremely tough and strong and is capable of being compressed and returned to substantially its original non-compressed shape. The polyurethane foam material can be made from one or more polyol components, such as, but not limited to, a polyether, polyester or polycarbonate-based di- or multifunctional hydroxyl-ended prepolymer or polyol, and at least one isocyanate component, including, for example, a modified isocyanate (MI) or a modified diphenylmethane diisocyanate (MDI) based monomeric diisocyanate or polyisocyanate, as well as other additives such as blowing agents, molecular cross linkers, chain extenders, surfactants, colorants and catalysts.

To avoid premature expansion during run-in, the shape-memory polymers can have a glass transition temperature that is about 20° C. or about 30° C. higher than the actual downhole deployment/application temperature.

Referring to FIG. 1, a shape-memory article (30) can be disposed on a support structure (10) such as a pipe (e.g. perforated base pipe), tubing, or string to form a downhole device. Before deployment, the shape-memory article is in a deformed state or a compacted shape. Deformed shape-memory polymers can be made by compressing or stretching the polymers with a mechanical force at a temperature greater than the glass transition temperature of the polymer. While still in the deformed state, the material is cooled down to a temperature below its glass transition temperature. The shape-memory polymers remain in the deformed shape induced on it after manufacture at surface temperature or at wellbore temperature during run-in.

A shape-memory article can be installed by introducing the downhole device into a wellbore; exposing the shape-memory article to a deployment emulsion; breaking the deployment emulsion to release the activation fluid; and contacting the shape-memory article in the compacted shape with the released activation fluid to deploy the shape-memory article.

In an aspect, the shape-memory article is exposed to the deployment emulsion before the downhole device is introduced into the wellbore, for example during manufacture. If needed, a degradable coating can be applied to the shape-memory article to make sure that the deployment emulsion can be kept within the shape-memory article when it is introduced downhole. The degradable coating can be corroded and removed at the time of deployment. In an aspect, the shape-memory article is porous, and the pore size of shape-memory article can be adjusted to minimize the loss of the deployment emulsion when it is carried by the shape-memory article to the target downhole location.

The shape-memory article can also be exposed to the deployment emulsion at a top portion of the wellbore. For example, the deployment fluid can be the first fluid that the shape-memory article encounters when run in the wellbore. By passing the shape-memory article through the deployment emulsion at the top portion of the wellbore ("splashing" it into the emulsion), the shape-memory article can become at least partially saturated with the deployment emulsion and can carry the emulsion with it to the target downhole location.

The deployment emulsion can contact at least 50 vol %, at least 90 vol %, or 100 vol % of the shape-memory polymer. In an aspect, the shape-memory article is saturated or soaked with the deployment emulsion.

The deployment emulsion can also be introduced into the wellbore before the downhole device is introduced. Alternatively, exposing the shape-memory article to the deployment emulsion can be achieved by circulating the deployment emulsion around the shape-memory article, or pumping the deployment emulsion through the shape memory article.

When needed, the deployment emulsion can be broken or activated to release the activation fluid, which can contact the shape-memory article and cause the shape-memory article to expand. Breaking could be done chemically, as a result of time and/or temperature, and/or upon application of an energy wave and/or an electrostatic field.

In an aspect, a change in temperature can break the deployment emulsion, allowing the discontinuous internal phase to coalesce. For example, breaking the deployment emulsion can include heating the deployment emulsion. The heat source can include the formation itself. The deployment emulsion can also be broken when it is allowed to stay in the downhole environment (as opposed to just passing by) for an extended period of time.

The deployment emulsion can also be broken chemically. For example, an emulsion breaker can be pumped from surface, or released from a containment device downhole. The containment device can be deployed together with the shape-memory article, or as a later operation. The emulsion breaker can include a demulsifier. Examples of the demulsifier include alkylphenol formaldehyde resin alkoxylates (AFRA), polyalkylene glycols (PAG), organic sulfonates, sulfonated glycerides, sulfonated oils, acetylated castor oils, ethylene and propylene oxide copolymers, alkoxylated amines and alkoxylated epoxy resins, ionic liquid. Other known demulsifiers can also be used.

Energy waves can also break the deployment emulsion. Suitable energy waves include sound waves, electromagnetic waves, or a combination comprising at least one of the foregoing. Exemplary energy waves include ultrasound, infrared radiation, microwave radiation, longitudinal wavers, transverse waves, and the like.

Energy waves can be generated through a wave emitter disposed downhole. Alternatively, energy waves can be generated at another location and directed to the deployment emulsion through a series of wave guides, a wireline, a coil tubing or the like. For example, energy waves can be generated on the earth's surface and directed underground to the deployment emulsion.

Other ways to break the deployment emulsion include applying an electrostatic field to the deployment emulsion. This can increase the movement of dispersed activation fluid such as droplets toward the electrodes, where they aggregate. More than one method can be used to break the deployment emulsion.

As illustrated in FIG. 2, during the deployment, the shape-memory article can expand in the radial direction and conform to the wall (20) of a wellbore to provide an expanded shape-memory article (38).

When the shape-memory article is a polymer foam, as a result of the shape-memory article being expanded to its set position, the open cell porous shape-memory foam can prevent production of undesirable solids from the formation and allow only desired hydrocarbon fluids to flow through the shape-memory foam. The foam cell pore size, size distribution and cell openness may be adjusted by formulating different components and by controlling processing conditions in such a way that only desired hydrocarbon fluids are allowed to flow through and undesirable solids from the formation are prevented from being produced.

Accordingly, in an aspect the shape-memory article is part of a screen device or assembly, which can optionally include additional layers or filtration components. For example, the screen assembly may be made from the shape-memory article, in combination with one or more additional filtration elements or layers, such as metal screens, wire mesh, polymeric screens, mesh wool, bead screens, perforated sleeves and/or others.

The screen assembly can be configured to filter undesirable material including sand from fluid entering the wellbore from a subsurface region. The screen assembly can include a tubular having a fluid conduit defined therein as a support structure, and the shape-memory article is disposed on an outer surface of the tubular and at least partially surrounding the tubular.

Alternatively, the shape-memory polymer may be designed to prevent fluids as well as solids from passing therethrough, in which case the tool is a packer or other isolation device. Thus, suitable downhole devices used in the methods described herein include an expansion tool, a packer, and an isolation plug.

Set forth below are some embodiments of the foregoing disclosure.

Aspect 1. A method of installing a downhole device comprises introducing a downhole device into a wellbore, the downhole device comprising a shape-memory article, the shape-memory article comprising a shape-memory polymer, wherein the downhole device is disposed when the shape-memory article is in a compacted shape; exposing the shape-memory article to a deployment emulsion comprising an activation fluid emulsified in a non-reactive fluid; breaking the deployment emulsion to release the activation fluid; and contacting the shape-memory article in the compacted shape with the released activation fluid to deploy the shape-memory article.

Aspect 2. The method as in any prior aspect, wherein the non-reactive fluid is a polar fluid, and the activation fluid is a non-polar fluid.

Aspect 3. The method as in any prior aspect, wherein the deployment emulsion is an inverse emulsion comprising the activation fluid as a discontinuous internal phase and the non-reactive fluid as a continuous external phase.

Aspect 4. The method as in any prior aspect, wherein the non-reactive fluid is a non-polar fluid comprising at least an oil or a non-polar solvent, and the activation fluid is a polar fluid comprising an activator.

Aspect 5. The method as in any prior aspect, wherein the activator comprises at least one of dimethyl sulfoxide, a ketone, an alcohol, a phenol, an ether, an ester, an acid, water, or a brine.

Aspect 6. The method as in any prior aspect, wherein the deployment emulsion further comprises at least one of an emulsifier, a surfactant, or a viscosifier.

Aspect 7. The method as in any prior aspect, wherein the deployment emulsion is an inverse emulsion comprising the activation fluid as a discontinuous internal phase and the non-reactive fluid as a continuous external phase; the activation fluid is a polar fluid comprising at least one of water, brine, dimethyl sulfoxide, a ketone, an alcohol, a phenol, an ether, an ester, or an acid; the non-reactive fluid is a non-polar fluid comprising at least one of an oil or a non-polar solvent; and the emulsion further comprises an emulsifier, and optionally at least one of a surfactant or a viscosifier.

Aspect 8. The method of claim 1, wherein the deployment emulsion has a density of about 0.75 lbs/gallon to about 17 lbs/gallon.

Aspect 9. The method as in any prior aspect, wherein the non-reactive fluid in the deployment emulsion has the same polarity as the shape-memory polymer.

Aspect 10. The method as in any prior aspect, wherein the shape-memory article is exposed to the deployment emulsion before the downhole device is introduced into the wellbore.

Aspect 11. The method as in any prior aspect, wherein the shape-memory article is exposed to the deployment emulsion at a top portion of the wellbore.

Aspect 12. The method as in any prior aspect, wherein the shape-memory article passes through the deployment emulsion at the top portion of the wellbore and becomes at least partially saturated with the deployment emulsion, and carries the deployment emulsion to a location where the shape-memory article is deployed.

Aspect 13. The method as in any prior aspect, further comprising introducing the deployment emulsion into the wellbore before the downhole device is introduced into the wellbore.

Aspect 14. The method as in any prior aspect, wherein exposing the shape-memory article to the deployment emulsion comprises circulating the deployment emulsion around the shape-memory article or pumping the deployment emulsion through the shape memory article.

Aspect 15. The method as in any prior aspect, wherein breaking the deployment emulsion comprises changing a temperature of the deployment emulsion, allowing the deployment emulsion to stay for an extended period of time in the wellbore, contacting the deployment emulsion with an emulsion breaker, applying an energy wave to the deployment emulsion, exposing the deployment emulsion to an electrostatic field, or a combination thereof.

Aspect 16. The method as in any prior aspect, the downhole device further comprises a support structure, and the shape-memory article is disposed at the support structure.

Aspect 17. The method as in any prior aspect, wherein the downhole device is an expansion tool; a screen assembly; a packer; or an isolation plug.

Aspect 18. The method as in any prior aspect, wherein the downhole device is a screen assembly configured to filter undesirable material including sand from fluid entering the wellbore from a subsurface region. The screen assembly has a support structure including a tubular having a fluid conduit defined therein, and the shape-memory article is disposed on an outer surface of the tubular and at least partially surrounds the tubular.

The use of the terms "a" and "an" and "the" and similar referents in the context of describing the invention (especially in the context of the following claims) are to be construed to cover both the singular and the plural, unless otherwise indicated herein or clearly contradicted by context. The terms "about", "substantially" and "generally" are intended to include the degree of error associated with measurement of the particular quantity based upon the equipment available at the time of filing the application. For example, "about" and/or "substantially" and/or "generally" can include a range of +8% or 5%, or 2% of a given value.

Unless defined otherwise, technical and scientific terms used herein have the same meaning as is commonly understood by one of skill in the art to which this invention belongs.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of installing a downhole device, the method comprising:
    introducing a downhole device into a wellbore, the downhole device a shape-memory article, the shape-memory article comprising a shape-memory polymer, wherein the downhole device is disposed when the shape-memory article is in a compacted shape;
    exposing the shape-memory article to a deployment emulsion comprising an activation fluid emulsified in a non-reactive fluid;
    breaking the deployment emulsion to release the activation fluid; and
    contacting the shape-memory article in the compacted shape with the released activation fluid to deploy the shape-memory article,
    wherein the deployment emulsion has a density of about 0.75 lbs/gallon to about 17 lbs/gallon.

2. The method of claim 1, wherein the non-reactive fluid is a polar fluid, and the activation fluid is a non-polar fluid.

3. The method of claim 1, wherein the deployment emulsion is an inverse emulsion comprising the activation fluid as a discontinuous internal phase and the non-reactive fluid as a continuous external phase.

4. The method of claim 3, wherein the non-reactive fluid is a non-polar fluid comprising at least an oil or a non-polar solvent, and the activation fluid is a polar fluid comprising an activator.

5. The method of claim 4, wherein the activator comprises at least one of dimethyl sulfoxide, a ketone, an alcohol, a phenol, an ether, an ester, an acid, water, or a brine.

6. The method of claim 1, wherein the deployment emulsion further comprises at least one of an emulsifier, a surfactant, or a viscosifier.

7. The method of claim 1, wherein
    the deployment emulsion is an inverse emulsion comprising the activation fluid as a discontinuous internal phase and the non-reactive fluid as a continuous external phase;
    the activation fluid is a polar fluid comprising at least one of water, brine, dimethyl sulfoxide, a ketone, an alcohol, a phenol, an ether, an ester, or an acid;
    the non-reactive fluid is a non-polar fluid comprising at least one of an oil or a non-polar solvent; and
    the emulsion further comprises an emulsifier, and optionally at least one of a surfactant or a viscosifier.

8. The method of claim 1, wherein the non-reactive fluid in the deployment emulsion has the same polarity as the shape-memory polymer.

9. The method of claim 1, wherein the shape-memory article is exposed to the deployment emulsion before the downhole device is introduced into the wellbore.

10. The method of claim 1, wherein the shape-memory article is exposed to the deployment emulsion at a top portion of the wellbore.

11. The method of claim 10, wherein the shape-memory article passes through the deployment emulsion at the top portion of the wellbore and becomes at least partially saturated with the deployment emulsion, and carries the deployment emulsion to a location where the shape-memory article is deployed.

12. The method of 1, further comprising introducing the deployment emulsion into the wellbore before the downhole device is introduced into the wellbore.

13. The method of claim 1, wherein exposing the shape-memory article to the deployment emulsion comprises circulating the deployment emulsion around the shape-memory article or pumping the deployment emulsion through the shape memory article.

14. The method of claim 1, wherein breaking the deployment emulsion comprises changing a temperature of the deployment emulsion, allowing the deployment emulsion to stay for an extended period of time in the wellbore, contacting the deployment emulsion with an emulsion breaker, applying an energy wave to the deployment emulsion, exposing the deployment emulsion to an electrostatic field, or a combination thereof.

15. The method of claim 1, wherein the downhole device further comprises a support structure, and the shape-memory article is disposed at the support structure.

16. The method of claim 1, wherein the downhole device is an expansion tool; a screen assembly; a packer; or an isolation plug.

17. The method of claim 1, wherein the downhole device is a screen assembly configured to filter undesirable material including sand from fluid entering the wellbore from a subsurface region.

18. The method of claim 17, wherein the screen assembly has a support structure including a tubular having a fluid conduit defined therein, and the shape-memory article is disposed on an outer surface of the tubular and at least partially surrounds the tubular.

* * * * *